US008837686B2

(12) United States Patent
Mosch et al.

(10) Patent No.: US 8,837,686 B2
(45) Date of Patent: Sep. 16, 2014

(54) REAL-TIME VOICE LOGGING OF TELEPHONE CALLS

(75) Inventors: Victor Bastiaan Mosch, Alkmaar (NL); Silvester Antonius Maria Steffens, Broek op Langedijk (NL); Lucas Lassche, Egmond Aan de Hoef (NL)

(73) Assignee: Nice Systems B.V., Utrecht (NL)

( * ) Notice: Subject to any disclaimer, the term of this patent is extended or adjusted under 35 U.S.C. 154(b) by 1581 days.

(21) Appl. No.: 11/915,306

(22) PCT Filed: May 23, 2005

(86) PCT No.: PCT/NL2005/000382
§ 371 (c)(1),
(2), (4) Date: Apr. 28, 2010

(87) PCT Pub. No.: WO2006/126869
PCT Pub. Date: Nov. 30, 2006

(65) Prior Publication Data
US 2011/0044317 A1 Feb. 24, 2011

(51) Int. Cl.
H04M 1/78 (2006.01)
H04M 1/656 (2006.01)
H04L 29/06 (2006.01)
H04M 3/42 (2006.01)
H04M 1/253 (2006.01)

(52) U.S. Cl.
CPC ........ H04M 3/42221 (2013.01); *H04M 1/2535* (2013.01); H04M 1/656 (2013.01); H04L 65/1083 (2013.01); H04L 65/1053 (2013.01)
USPC ............................. 379/67.1; 379/85; 709/224

(58) Field of Classification Search
CPC ..... H04L 65/608; H04L 65/60; H04L 65/601; H04M 3/42221; H04M 1/738; H04M 7/0021
See application file for complete search history.

(56) References Cited

U.S. PATENT DOCUMENTS 6,122,665 A * 9/2000 Bar et al. ...................... 709/224
6,909,708 B1 * 6/2005 Krishnaswamy et al. .... 370/352
(Continued)

FOREIGN PATENT DOCUMENTS

WO WO 02/065704 A1 8/2002

OTHER PUBLICATIONS

International Search Report for PCT/NL2005/000382 dated Feb. 6, 2006.

*Primary Examiner* — Asad Nawaz
*Assistant Examiner* — Jason Harley
(74) *Attorney, Agent, or Firm* — Pearl Cohen Zedek Latzer Baratz LLP

(57) ABSTRACT

An office telephone system contains packet switched network and network telephone sets coupled to said packet switched network for transmitting and receiving speech data in addressed packets. A packet switched network interface taps the packet switched network and processes packets received from the packet switched network by identifying first and second packets that contain network voice call data for respective sides of a network telephone calls. The packet switched network interface mixing speech data from the first and second packets into streams while the call proceeds. Each stream comprising a mix of speech data from both sides of a respective one of the network telephone calls. An application program interface defines provides access to the streams to a programmable set of applications. In addition a line interface circuit taps call dedicate telephone lines outside the network and generates further speech data streams from signals from the call dedicated telephone lines. The application program interface defines provides interchangeable types of calls to access streams generated from both sources.

10 Claims, 2 Drawing Sheets

(56) References Cited

U.S. PATENT DOCUMENTS

| | | | |
|---|---|---|---|
| 2001/0030951 A1* | 10/2001 | Kokot et al. | 370/329 |
| 2002/0075815 A1* | 6/2002 | Sharma et al. | 370/276 |
| 2003/0223461 A1* | 12/2003 | Sharma et al. | 370/493 |
| 2004/0028030 A1* | 2/2004 | Lai et al. | 370/352 |
| 2004/0120478 A1* | 6/2004 | Reynolds et al. | 379/88.19 |
| 2005/0207405 A1* | 9/2005 | Dowling | 370/352 |
| 2005/0220086 A1* | 10/2005 | Dowling | 370/352 |

* cited by examiner

US 8,837,686 B2

REAL-TIME VOICE LOGGING OF TELEPHONE CALLS

CROSS-REFERENCE TO RELATED APPLICATIONS

This application is a National Phase Application of PCT International Application No. PCT/NL2005/000382, International Filing Date May 23, 2005, which is hereby incorporated in its entirety.

FIELD OF THE INVENTION

The invention relates to voice logging of telephone calls. Voice logging involves recording of speech data from telephone conversations for such purposes as quality control, retention of information about agreements reached during calls etc.

BACKGROUND ART

Voice logging has evolved from the use of a tape recorder coupled to a telephone line to record the conversation during a call. Today's voice logging apparatuses are far more complex. Typically such apparatuses are now implemented as circuit boards that can be inserted into the bus of a general purpose computer and have a connector for connecting to one or more telephone lines. The circuit board samples speech data from the telephone lines and to convert the sampled speech data into data that is transmitted via the bus. The assignee of the present patent application has developed an Application Program Interface (API) for such circuit boards. Many offices have started to use shared lines for transmission of both telephone speech data and computer data, e.g. computer data sent according to the Internet Protocol. Combination of speech data and computer data is referred to as VoIP (Voice Over IP). In more advanced office systems, the line is shared for speech data and computer data from a plurality of network terminals. Voice logging apparatuses have been developed for this type of office system as well. The network interface card of a general-purpose computer is attached to the shared line to monitor the headers of data packets, to detect packets that contain speech data of a call and to write these packets to disk. There have been problems with such systems because of the vast amount of data that may pass over a shared line. These problems have been solved by using additional signal lines from the office telephone exchange to signal when telephone calls take place, and preferably also to provide call-signalling data (source telephone number etc.). Furthermore, it has been practice to store all speech packets at real time without further analysis and to reassemble the speech signals later on, when the data is retrieved for use, from the stored speech packets and the call-signalling data. Since signalling data is provided by a telephone-exchange this approach has typically limited logging to outside calls, which pass through the office exchange, without logging intra-office calls that pass via the VoIP connection but need not reach the office-telephone exchange.

Accordingly heretofore there have been two distinct voice-logging systems, for logging VoIP calls and line calls respectively. This has been found to complicate management of office voice logging.

SUMMARY OF THE INVENTION

It is desirable to provide voice-logging systems with an interface that outputs a stream of voice call data that is obtained from a network in a form as if the voice call data was derived from a dedicated telephone line will the call is in progress.

It is desirable to provide voice-logging systems that are able to integrate voice logging of VoIP calls and line calls.

BRIEF DESCRIPTION OF THE DRAWING

Non-limitative embodiments will be described using the following figures.

DETAILED DESCRIPTION OF THE DRAWING

Figure 1:
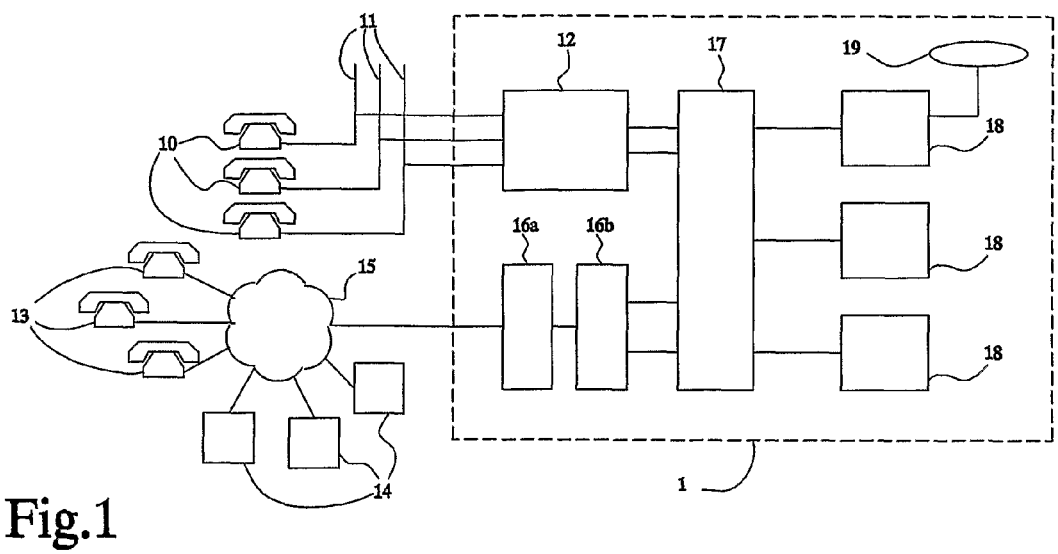
FIG. 1 shows a voice logging system

FIG. 1 shows a voice logging system. The system contains a plurality of voice telephones 10 coupled to analog and/or digital telephone lines 11 and a plurality of VoIP telephones 13 coupled to a Local Area Network (LAN) 15. In addition to VoIP telephones 13 data processing devices may be coupled to LAN 15. As shown, lines for the data processing devices are coupled separately to LAN 15, but they may also be coupled via VoIP telephones 13. Telephone lines 11 typically are connected to one or more local telephone exchanges (not shown) that serve to provide switched connections for calls to or from telephones 10. Similarly, a telephone exchange interface (not shown) may be coupled to LAN 15 to feed call data into LAN 15 from one or more telephone exchanges (not shown) or vice versa.

The voice logging system furthermore contains a voice logging apparatus 1 that comprises a call monitoring circuit 12, a network interface circuit 16a, a call assembly component 16b, a common interface 17 and applications 18, including at least one voice logging application 18 that is coupled to a storage device 19 such as a disk. Call monitoring circuit 12 has inputs coupled to analog telephone lines 11. Network interface circuit 16a has an input coupled to LAN 15 and an output coupled to call assembly component 16b. Call monitoring circuit 12 and call assembly component 16b are coupled to common application program interface 17, which in turn is coupled to applications 18.

It should be realized that part of the components of the voice logging system of FIG. 1 may be implemented as special purpose circuits and/or by a suitably programmed computer. Such a computer may be programmed to perform the functions of common interface 17 and applications 18 for example.

Figure 2:
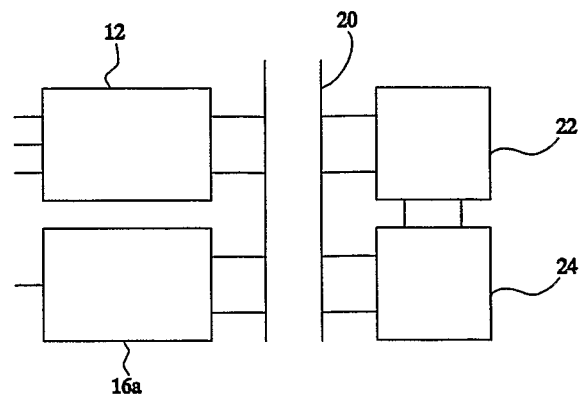
FIG. 2 shows a circuit implementing part of the voice logging system

FIG. 2 shows circuits involved in an implementation that uses a programmed computer. This implementation uses call monitoring circuit 12 and network interface circuit 16a coupled to a bus 20 to which a memory 22 and an instruction processor 24 are coupled. In memory 22 programs of instructions have been loaded that, when executed by instruction processor 24, cause instruction processor 24 to perform the functions of call monitoring circuit 12, call assembly component 16b, application program interface 17 and optionally applications 18.

Figure 1A:
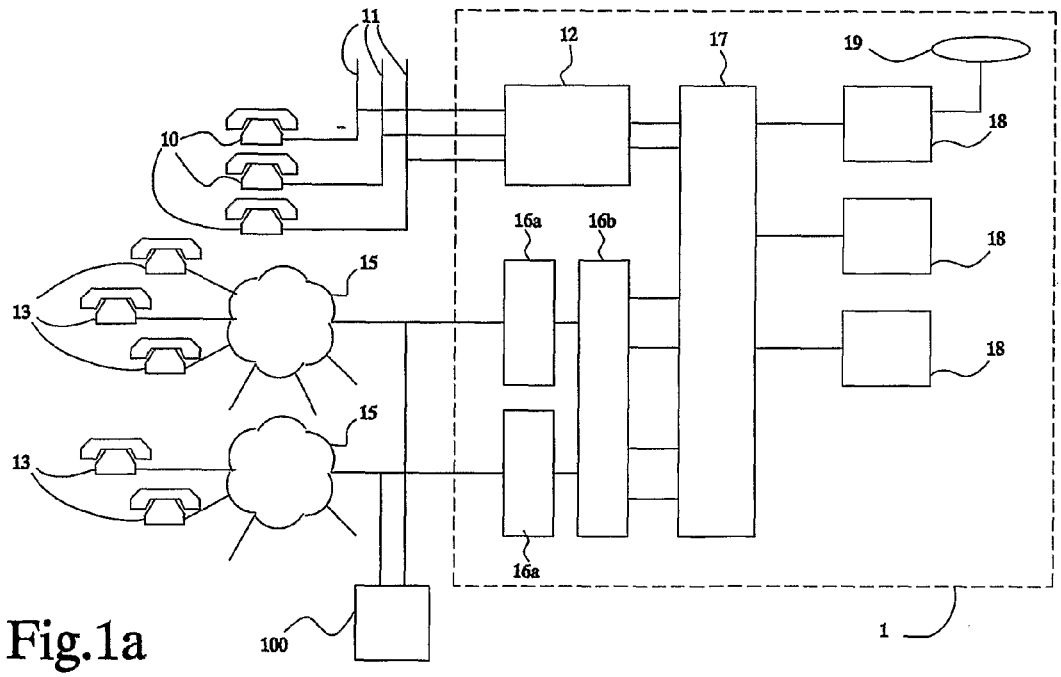
FIG. 1a shows a further voice logging system

FIG. 1a shows another embodiment wherein a plurality of networks 15 are connected to voice logging apparatus 1. In the example networks 15 are sub-networks of a larger network in which they are mutually coupled via a connection circuit 100. In one example respective networks 15 are connected to terminals on respective floors of an office building. All networks can be coupled to applications 18 via application program interface 17. As shown, a respective network interface circuits 16a are provided for each network 15 and a shared call assembly component 16b is coupled to both network interface circuits 16a. Alternatively a shared network interface circuit 16a may be shared by different networks 15.

In operation telephone calls are made both via analog and/or digital telephone lines 11 and via LAN 15. Data for a plurality of calls plus optionally other data is transmitted via LAN 15. Each analog and/or digital telephone lines 11 is dedicated to a single telephone set and connects the telephone set to a telephone exchange (not shown). When a call from the telephone set is going on the line is dedicated to that call.

Analog telephone calls involve undulations of the voltages on telephone lines 11 that correspond to the sound vibrations produced by speakers at telephones on both sides of each telephone line 11. Signalling data are transmitted for example as signalling tones, bell voltages etc. In case of digital telephone lines streams of digitally encoded sample values are transmitted to represent the vibrations on telephone lines 11.

On LAN 15 call data is transmitted in packets, each containing a limited amount of data. Each packet includes a destination address and typically also a source address as well as data. The destination address determines which of the LAN terminals 13, 14 will read the packet. Packets for telephone calls between different pairs of source and destination addresses may be transmitted over a same conductor (or optical fiber) of LAN 15, the destination address of each packet controlling where the packet will be used.

The voice logging apparatus taps telephone data from telephone lines 11 and LAN 15, even though this telephone data is not specifically destined for it. Call monitoring circuit 12 handles signal values on telephone lines. In one embodiment call monitoring circuit 12 may have an input only for connection to a single telephone line 11, but preferably it has parallel inputs for connection to a plurality of telephone lines, for example at a point where these telephone lines come together for connection to a local telephone exchange (not shown).

In the case of an analog telephone line 11 handling typically involves analog to digital conversion of the voltages on a telephone line and some processing to distinguish different signals, such as signals that represent speech and tone signals and/or bell signals that represent call signals. Call monitoring circuit 12 converts the sampled signals into two streams: a stream of signal data and a stream of digital speech data samples. In view of the two-way nature of voltages on an analog telephone line the digital speech data samples typically represent a sum of signals from both sides of the line. Preferably, the effects of signalling are suppressed in the speech data, e.g. by omitting samples from time intervals wherein tone signalling has been detected or wherein bell signals, on-hook signals etc have been detected. When a plurality of telephone lines is connected to call monitoring circuit 12, call monitoring circuit 12 is preferably designed to add line identification information to both the signal data and the speech data. Each telephone line 11 may be assigned a predetermined identification number for example and that number may be added to data obtained from that line.

In the case of a digital telephone line 11 handling typically involves demodulation of digital information and some processing to identify digital values that represent speech signals and signalling data. Typically, digital signals from different sides of the line alternate in a time division multiplexed manner. Call monitoring circuit 12 uses the digital information to generate two streams: a stream of signal data and a stream of digital speech data values, wherein speech data values from both sides of the line have been added. When a plurality of telephone lines is connected to call monitoring circuit 12, call monitoring circuit 12 is preferably designed to add line identification information to both the signal data and the speech data.

Network interface circuit 16a samples data transmitted over a conductor or fibre of LAN 15 and reconstructs packets from LAN 15. Network interface circuit 16a submits the packet to call assembly component 16b. Call assembly component 16b stores a list of source and/or destination addresses for which telephone calls will be logged. Call assembly component 16b inspects each packet from network interface circuit 16a to determine whether its source or destination address corresponds to an address from the list. If so call assembly component 16b inspects the packet to determine whether it contains speech data and/or signalling data. Typically, the type of data can be detected from the port address that a packet contains in addition to a destination or source address.

Call assembly component 16b uses the digital information to generate two streams: a stream of signal data and a stream of digital speech data values, wherein speech data values have been added from both packets that have a listed address as source address and packets that have the listed address. Typically, each packet contains information about a plurality of speech data samples. In an embodiment, the packets contain compressed speech data. In this embodiment call assembly component 16b decompresses the compressed speech data before adding data from both packets that have a listed address as source address and packets that have the listed address. When more than one address is stored in the list in call assembly component 16b, call assembly component 16b is preferably designed to an identification of the address in the list to both the signal data and the speech data.

Preferably, when call assembly component 16b receives data from more than one network, call assembly component 16b monitors packet identification data and to detect copies of a packet that are received during a time interval after the packet has first been received, and discards these copies without using the data from the copies.

Application program interface 17 provides for the interaction with applications 18 and routes the streams from call monitoring circuit 12 or call assembly component 16b in the same way into data that is provided to applications 18. When data is received from more than one network 15 the data from different networks is routed in the same way to applications 18. Preferably application program interface 17 is designed so that it has indistinguishable types of call for providing applications access t both call monitoring circuit 12 or call assembly component 16b. In one embodiment application program interface 17 supports program function calls subscribe(handler) or subscribe(handler, line)

sendSignalData(line, parameters) or sendSignalData(line, parameters)

sendSpeechData(line, pointer)

Herein "subscribe" is a function of the application program interface 17 that can be called by an application 18 to indicate that a handler should be notified when signal data or speech data is available. Optionally, the call to the subscribe function includes an identification of a line (e.g. the identification of the input connection of call monitoring circuit 12 from which signal data or speech data is requested, or an identification of the packet addresses for which signal data or speech data is requested).

Optionally a further function of the application program interface 17 is provided that can be called by an application to add addresses to the list of addresses in assembly component 16b for which assembly component 16b will transmit data from the packets into the streams of speech data and signal data. Preferably, application program interface 17 is arranged to return a line handle that identifies a position of the address in the list, for later use in subscribe calls.

The sendSignalData and sendSpeechData functions are functions that the handler of an application 18 should be able to receive. Optionally, these functions have an argument to identify a line for which the function is called. The parameters of the sendSignalData call indicate the signal data in some standardized way. An example of a set of parameters that may be used is telephone number of calling party,
telephone number of called party, However, it should be realized that other sets of parameters may be used. The pointer of the sendSpeechData call indicates a memory address from where speech data are available (typically a fixed length of data is assumed, but alternatively a length may be defined).

In operation, an application 18 will first call the "subscribe" function and subsequently application program interface 17 will call the sendSignalData function followed by repeatedly calls of the sendSignalData function, each time when (sufficient) data is available. Application 18 can use the data according to its needs. In a voice logging application 18, for example, application 18 may write that speech data from beginning to end of a call into a file on a storage device 19 like a disk drive, including header information for the call that is derived from parameters of the signalling data.

Optionally, additional function of the application program interface 17 that can be called by an application 18 may be provided acknowledgeSpeechData( )
acknowledgeSpeechData( )

To indicate that an application 18 no longer needs data from a previously provided memory address.

Although function calls have been given by way of example, it should be clear that the invention is not limited to an application program interface 17 with these functions. Different interfaces may provided, e.g. interfaces that allow application programs to poll for the availability of speech data after receiving a call to indicate signalling data, fully polling interfaces, interfaces that include speech data as parameters of calls instead of pointers to memory etc. Instead of pointing to data directly, calls to and/or from the application program interface may use references to descriptor blocks in memory wherein parameters for data transfer have been stored (using the same type of descriptor blocks both for data obtained from LAN 15 and telephone lines 11). In an embodiment the latest signalling data may be part of such a descriptor block for subsequent speech data. In a further embodiment application program interface 17 may provide for compression of the speech data, optionally under control of applications 18.

Figure 3:
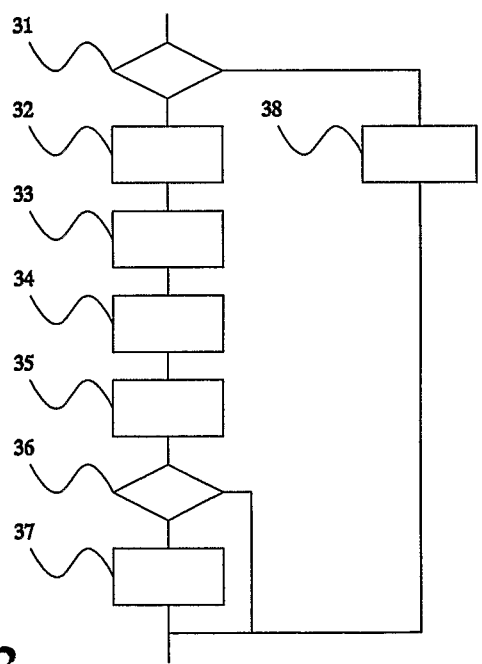
FIG. 3 shows a flow-chart of operations for a packet

In the implementation that uses the circuits of FIG. 2, network interface 16*a* typically writes each received packet to a working memory and then causes instruction processor 24 to execute of program instructions that perform the functions of call assembly component 16*b*. FIG. 3 shows a flow-chart of the operations performed in this case a first step 31 to compare the destinations and/or source address of the packet with the listed addresses, and if the address matches a second step 32 to determine whether the packet contains speech data or signalling data (e.g. by inspecting the port address)

a third step 33 if the packet contains speech data, decompressing the data is necessary (fourth step 34) and adding the speech values that have been extracted from the packet to speech data from earlier packets in a working memory (appending the data to earlier data, or adding data values of contemporary data for the other signal direction) in fifth step 35; preferably, the amount speech data in the buffer is compared with a threshold in a sixth step 36 and if the threshold is reached a signal is sent to application program interface 17 in a seventh step 37 an eight step 38 if the packet contains signalling data, the signalling data is converted to a standard representation and stored it into a signalling data buffer and a signal is sent to application program interface 17

Call monitoring circuit 12 similarly writes speech data and signalling data into buffers and sends signals to application program interface 17.

Similarly, in the implementation that uses the circuits of FIG. 2, application program interface 17 typically involves execution of program instructions by instruction processor 24 to perform the functions of the application program interface 17, that is, to record that a specified handler has subscribed (to a line) and to respond to signals from call assembly component 16*b* and call monitoring circuit about the availability of speech data and signalling data by calling the subscribed handlers with a pointer to the speech data or with the signalling data as parameters. Preferably, shared buffer memories are used for all applications 18, so that applications that have subscribed to the same line will get access to the same buffer memory. Alternatively, separate buffer memories (or memory areas) may be used, in which case application program interface 17 preferably copies the buffered data as many time as required by the subscriptions.

Even the applications 18 may be implemented by means of execution of program instructions by instruction processor 24, to retrieve speech data from the buffer and to write the speech data to a file on a disk drive for example.

However, it should be realized that the invention is not limited to this implementation. For example, part or all of the functions executed by instruction processor 24 may be executed by dedicated circuits or distributed over different instruction processors 24. The various buffer memories may be located in call monitoring circuit 12 and/or network interface 16*a*, or part or all of the buffer memories may be part of memory 22.

It should be appreciated that one advantage of the described voice logging system is that it application program interface 17 ensures that real time application programs 18 (i.e. programs that process the telephone data as the call progresses) do not have to provide for different access to telephone calls from LAN 15 and from telephone lines 11. To realize this, speech data from packets from opposite ends of a telephone connection realized by LAN 15 are preferably mixed before this speech data is made available to applications 18 from application program interface 17. In addition, interface functions may be provided to provide applications 18 access to both sides of a call via LAN 15 separately, but in this case the application has to be designed differently for calls from LAN 15 and telephone lines 11. If such functions for separate access are used, these function could also be used to access speech data from telephone lines 11, but in this case the same data mixed from both sides is preferably has to be returned by functions for access for either side, to that the speech data from telephone lines 11 would not be equivalent to speech data obtained from LAN 15.

Also, preferably no selective storage of packets is used. All received packets are stored for inspection and if the packet contains relevant data, the data is immediately extracted and used to form part of a continuous stream of speech data or a report of signalling data. The original packet structure is preferably not passed to applications 18, so that source dependence (LAN 15 or telephone lines 11) arises. e.g. during storage of a file that contains speech data for a call.

Although a single network interface 16*a* with a single input to a LAN 15 has been described, it should be appreciated that a plurality of LAN's 14, or a plurality of connections to a LAN 15 could be coupled to application program interface. In an embodiment a known network router circuit (not shown) is used with first ports connected to individual terminals such as VoIP telephones 13, a second port coupled to a further part of the network and a third port. This router circuit is arranged to route packets according to their destination addresses from the first and second ports to selected ones of the first and second ports and to pass copies of all packets from the first and second ports to the third port.

In this embodiment network interface 16*a* is preferably coupled to the third port of such a router circuit to monitor for packets with telephone data for any of VoIP telephones 13. When a plurality of such router circuits is used, each a different group of VoIP telephones 13 a plurality of network interfaces 16*a* coupled to a same application program interface 17 (via respective call assembly components 16*b* or via a shared call assembly component 16*b*), or a network interface with a plurality of inputs may be used to connect the third ports of each of the plurality, so that one application program interface 17 will be provided with data for all VoIP telephones 13.

As an alternative, in this embodiment, network interface 16*a* could be connected to the first ports to tap packets. Thus, network interface 16*a* would be connected to lines that are each dedicated to a single VoIP telephone 13. However, in this alternative a larger number of network interface connections would be needed. Moreover it is preferred not to connect directly to the data-carrying path, since this could compromise data integrity.

The invention claimed is:

1. A telephone voice logging apparatus, the apparatus comprising:
    a packet switched network interface with a network input for coupling to a packet switched network,
    an output for outputting a stream of digitized samples for storage,
    a circuit arranged to process packets received from the network input by identifying first and second packets that contain network voice call data originated from opposite sides of a network telephone call and assembling data from the opposite sides of the telephone call to form the stream while the network telephone call proceeds, wherein the steam comprises a mix of speech data extracted from the first and second packets,
    an application program interface coupled to the output, the application program interface defining an interface for feeding the stream to a programmable set of one or more applications while the network telephone call proceeds, and
    a line interface circuit with a line input for coupling to a telephone set dedicated telephone line, a further output for a further stream of digitized samples and circuits arranged to generate the further stream from signals from the line input; wherein the application program interface is coupled to the output and the further output, the application program interface defining a common interface or mutually interchangeable interfaces to the stream and the further stream respectively,
    wherein the line interface circuit is arranged to retrieve first signaling data of a telephone call from the signals from the line input and to feed the first signaling data to the application program interface, the packet switched network interface being arranged to retrieve second signaling data for the network voice call from the packets received from the network input and to feed the second signaling data to the application program interface, the application program interface providing a common type of call for supplying the first and second signaling data to applications respectively.

2. A telephone voice logging apparatus according to claim 1, wherein the application program interface provides a common type of call for supplying the stream and the further stream to applications respectively, the apparatus comprising a storage device and a storage control application arranged to control storage of recordings of telephone calls on the storage device, the storage control application being arranged to obtain the stream and the further stream for recording respective telephone calls, using said same type of call for both the stream and the further stream respectively.

3. A telephone voice logging apparatus according to claim 1, wherein the packet switched network interface comprises a network interface circuit and a call assembly component, the network interface circuit having an interface input coupled to the network input, the call assembly component being arranged to inspect packets from the network interface circuit, to select the first and second packets and to mix speech data from streams of first and second packets into the stream.

4. A telephone voice logging apparatus according to claim 1, wherein the packet switched network interface comprises a further network input, a first and second network interface circuit and a call assembly component, the network interface circuit having an input coupled to the first and second packet switched network, the call assembly component being arranged to inspect packets from the network interface circuits, to select the first and second packets and to mix speech data from streams of first and second packets into the stream.

5. A method of logging voice telephone calls, the method comprising:
    receiving packets from a packet switched network;
    identifying among the received packets first and second packets that contain network voice call data originated from opposite sides of a network telephone call;
    forming a stream of digitized samples for storage by mixing speech data extracted from the first and second packets, each associated with an opposite side of the telephone call, while the network telephone call proceeds;
    supplying the stream to a programmable set of one or more applications while the network telephone call proceeds;
    generating a further stream of digitized samples from signals on a telephone set dedicated telephone line;
    supplying the stream and the further stream to an application via an application program interface that defines a common call type or interchangeable types of call for providing access to the stream and the further stream respectively;
    retrieving first signaling data of a telephone call from the signals from the telephone set dedicated telephone line;
    feeding the first signaling data to the application program interface;
    selecting packets received from the packet switched network that comprise signaling data;
    retrieving second signaling data from the selected packets; and
    feeding the second signaling data to the application program interface, supplying both the first and second signaling data to an application using interchangeable types of calls respectively.

6. A method according to claim 5, the method further comprising recording the stream and the further stream obtained from the application program interface on a recording device.

7. A telephone system comprising:
a telephone set dedicated telephone lines and telephone sets coupled to respective ones of said telephone set dedicated telephone lines;
a packet switched network and network telephone sets coupled to said packet switched network for transmitting and receiving speech data in addressed packets;
a line interface circuit coupled to tap the telephone set dedicated telephone lines and arranged to generate first speech data streams from signals from the telephone set dedicated telephone lines;
a packet switched network interface coupled to tap the packet switched network and arranged to process packets received from the packet switched network by identifying first packets that contain network voice call data originated from a first side of a network telephone call and second packets that contain network voice call data originated from a second opposite side of the telephone call and mixing and assembling speech data extracted from the first and second packets to form a second stream associated with the telephone call while the network telephone call proceeds; and
an application program interface that defines a common type of call or interchangeable types of call for providing applications access to the first and second streams respectively,
wherein the line interface circuit is arranged to retrieve first signaling data of a telephone call from the signals from the telephone set dedicated telephone lines and to feed the first signaling data to the application program interface, the packet switched network interface being arranged to retrieve second signaling data for the network voice call from the packets received from the packet switched network and to feed the second signaling data to the application program interface, the application program interface providing indistinguishable types of calls for supplying the first and second signaling data to applications respectively.

8. A telephone system according to claim 7, further comprising a storage device and a storage control application arranged to control storage of recordings of telephone calls on the storage device, the storage control application being arranged to obtain the first and second stream for recording respective telephone calls, using said same type of call for both the first and second stream respectively.

9. A non-transitory computer program product comprising a program of instructions which, when executed by an instruction processor causes the instruction processor to perform the steps of:
generating a first stream of digitized samples from signals on a telephone set dedicated telephone line;
identifying first and second packets among packets received from a packet switched network that contain network voice call data originated from opposite sides of a network telephone call;
forming a second stream of digitized samples for storage by mixing speech data extracted from the first and second packets, each associated with an opposite side of the telephone call, while the network telephone call proceeds;
supplying the first and second stream to an application via an application program interface that defines a same type of call for providing access to the first and second stream respectively;
retrieving first signaling data of a telephone call from the signals from the telephone set dedicate telephone line;
feeding the first signaling data to the application program interface;
selecting packets received from the packet switched network that comprise signaling data;
retrieving second signaling data from the selected packets;
feeding the second signaling data to the application program interface; and
supplying both the first and second signaling data to an application using a same type of call respectively.

10. A telephone voice logging apparatus, the apparatus comprising:
a line interface circuit with a first input for coupling to a telephone set dedicated telephone line, a first output for a first stream of digitized samples and circuits arranged to generate the first stream from signals from the first input;
a packet switched network interface with a second input for coupling to a packet switched network, a second output for a second stream of digitized samples and circuits to process packets received from the second input by identifying first and second packets that contain network voice call data originated from opposite sides of a network telephone call and assembling data from the opposite sides of the telephone call to form the stream while the network telephone call proceeds, wherein the steam comprises a mix of speech data extracted from the first and second packets;
an application program interface coupled to the first and second output, the application program interface defining interchangeable types of call for providing applications access to the first and second stream respectively;
a line interface circuit with a line input for coupling to a telephone set dedicated telephone line; wherein the application program interface defines a common interface or mutually interchangeable interfaces to the first stream and the second stream respectively, and
wherein the line interface circuit is arranged to retrieve first signaling data of a telephone call from the signals from the line input and to feed the first signaling data to the application program interface, the packet switched network interface being arranged to retrieve second signaling data for the network voice call from the packets received from the network input and to feed the second signaling data to the application program interface, the application program interface providing a common type of call for supplying the first and second signaling data to applications respectively.

* * * * *